J. E. MILLER & T. J. FOX.
DISK GARDEN PLOW.
APPLICATION FILED SEPT. 10, 1917.

1,253,860.

Patented Jan. 15, 1918.
2 SHEETS—SHEET 1.

Witness
J. R. Pierce

Inventors
J. E. Miller
and T. J. Fox
By H. B. Willson & Co.
Attorneys

J. E. MILLER & T. J. FOX.
DISK GARDEN PLOW.
APPLICATION FILED SEPT. 10, 1917.
1,253,860.
Patented Jan. 15, 1918.
2 SHEETS—SHEET 2.
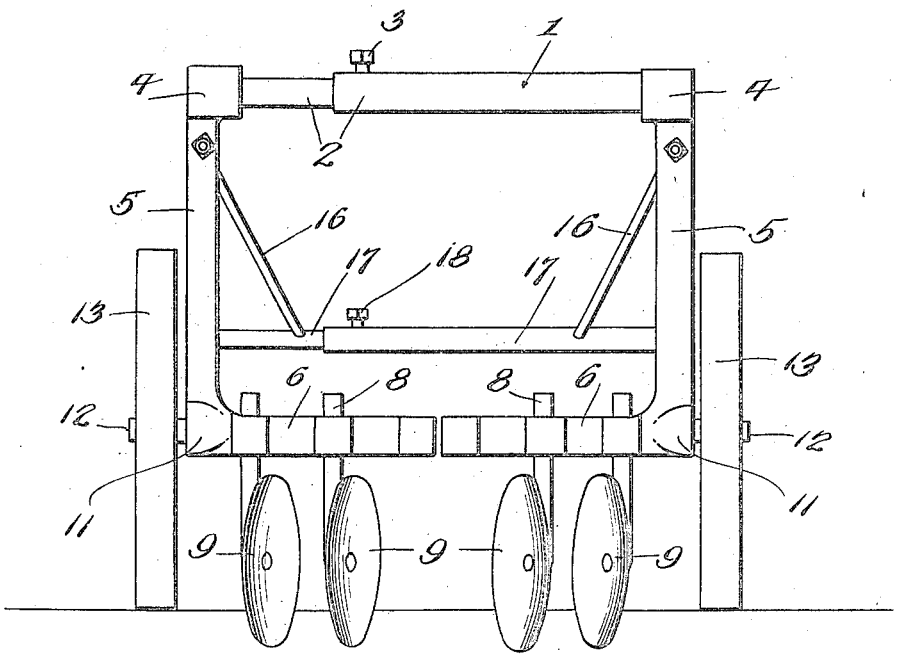
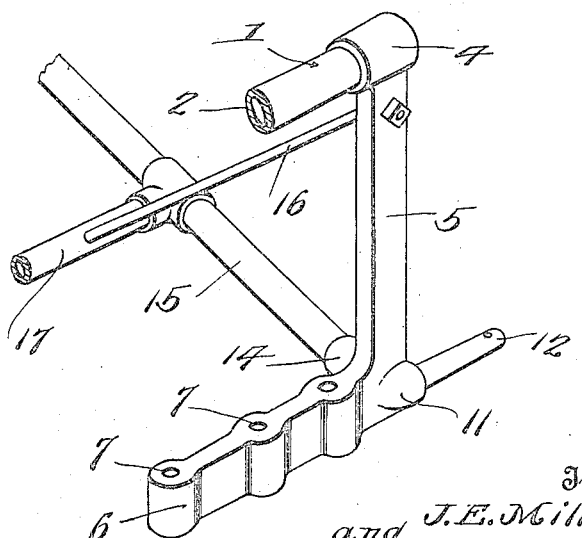
Inventors
J. E. Miller
and T. J. Fox

UNITED STATES PATENT OFFICE.

JACOB E. MILLER AND THOMAS J. FOX, OF COON RAPIDS, IOWA; SAID MILLER ASSIGNOR TO SAID FOX.

DISK GARDEN-PLOW.

1,253,860.　　　　　　　　Specification of Letters Patent.　　　Patented Jan. 15, 1918.

Application filed September 10, 1917.　Serial No. 190,562.

*To all whom it may concern:*

Be it known that we, JACOB E. MILLER and THOMAS J. FOX, are citizens of the United States, residing at Coon Rapids, in the county of Carroll and State of Iowa, have invented certain new and useful Improvements in Disk Garden-Plows; and we do declare the following to be a full, clear, and exact description of the invention, such as will enable others skilled in the art to which it appertains to make and use the same.

Our invention has for its object to provide a simple and inexpensive, yet a highly efficient and durable hand plow or cultivator employing a plurality of disks rather than other types of earth-working implements, provision being made for increasing and decreasing the width of the entire machine and for setting the disks for throwing the earth either outwardly or inwardly at any required angle.

With the foregoing general object in view, the invention resides in certain novel features of construction and unique combinations of parts to be hereinafter fully described and claimed, the descriptive matter being supplemented by the accompanying drawings which form a part of this specification and in which:—

Fig. 3 is a front elevation; and

Fig. 4 is a perspective view of one of the L-shaped castings and associated parts.

Figure 1:
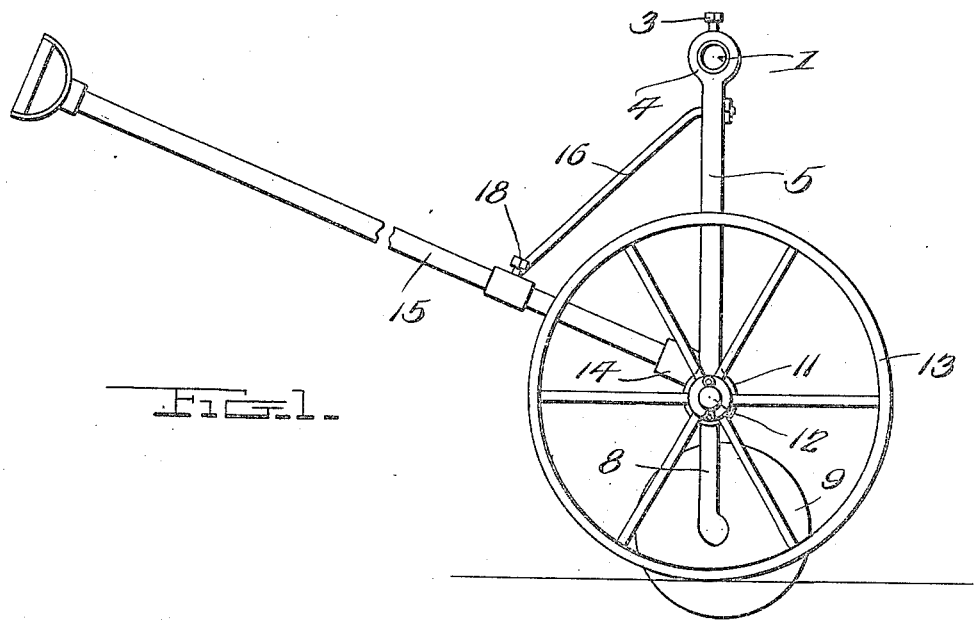
Figure 1 is a side elevation of the improved plow.
Figure 2:
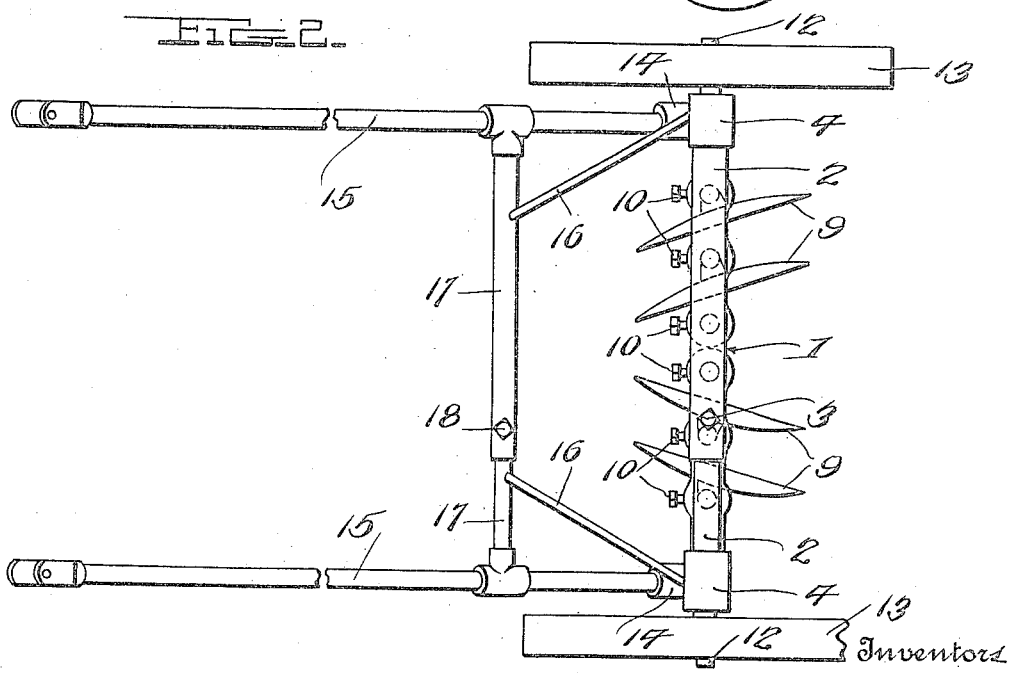
Fig. 2 is a top plan view thereof.

In the drawings above briefly described, the numeral 1 designates a crown bar extending transversely of the line of travel of the machine, said bar consisting of a pair of telescopic sections 2 secured against relative movement by a set screw 3. When required, however, loosening of the screw 3 will permit the bar 1 to be varied in length to increase or decrease the width of the machine as occasion may demand.

The ends of the bar 1 are anchored in any preferred manner in bosses 4 which are formed on the upper ends of a pair of L-shaped castings 5, the horizontal arms 6 of said castings extending inwardly toward each other and being formed with spaced openings 7 adapted to receive vertical shanks 8 which rise from the disks 9 or other implements which may be employed.

The shanks 8 are movable vertically in the openings 7 and may be turned in either direction, in order that the depth of cultivation may vary and in order that the disks may be adjusted to different angles for throwing earth as required. Set screws 10 or other suitable means are provided for securing the shanks 8 in adjusted position.

The angles of castings 5 are provided with bosses 11 from which stub axles 12 project outwardly, said castings carrying a pair of supporting wheels 13. Additional bosses 14 are formed on the rear sides of the castings 5, and the front ends of a pair of handles 15 are secured in said bosses, said handles being connected near their front ends by a transverse tie rod 16 formed of a pair of telescopic sections 17 secured together by a set screw or the like 18.

Preferably employed in connection with the features of construction above described, are two braces 19 which extend from the upper ends of the castings 5 to the handles 15 or to the tie rod 16.

The provision of the braces in question prevents possible loosening of the front ends of the handles and when said braces are secured to the tie rod 16 at points spaced from its ends, they also serve to prevent parallelogrammatic movement of the several parts of the frame.

By the features of construction above described, the width of the entire machine may be readily controlled by loosening the set screws 3 and 18 and properly adjusting the bar 1 and rod 16, after which said screws are again tightened. The disks 9 may also be adjusted to the proper angle and elevation by the set screws 10. Furthermore, by the provision of the last named screws, any of the shanks 8 which are not required may be detached.

From the foregoing, taken in connection with the accompanying drawings, it will be obvious that although our invention is of extremely simple and inexpensive construction it will be highly efficient and durable. Since probably the best results are obtained from the specific details shown and described, such details constitute the preferred form of the machine. We wish it understood, that within the scope of the invention as claimed, numerous minor changes may well be made without sacrificing the principal advantages.

We claim:

1. A hand implement comprising a transverse crown bar, a pair of L-shaped members rigidly secured at their upper ends to the ends of said crown bar, the horizontal arms of said members extending inwardly toward each other and having longitudinally spaced openings to receive the shanks of earth-working tools, a supporting wheel on each of said members, and a pair of handles extending rearwardly from said members.

2. A hand implement comprising a transverse crown bar, a pair of L-shaped members secured at their upper ends to the ends of said crown bar, the horizontal arms of said members extending inwardly toward each other and having vertical openings spaced longitudinally thereof, implement shanks secured in said openings for vertical adjustment and for turning movement, a wheel on each of said members, and a pair of handles extending rearwardly from said members.

In testimony whereof we have hereunto set our hands in the presence of two subscribing witnesses.

JACOB E. MILLER.
THOMAS J. FOX.

Witnesses:
JAMES M. HUMPHREY,
ETTA D. MORRIS.

Copies of this patent may be obtained for five cents each, by addressing the "Commissioner of Patents, Washington, D. C."